United States Patent [19]

Raffy et al.

[11] 4,199,295

[45] Apr. 22, 1980

[54] METHOD AND DEVICE FOR REDUCING THE NOISE OF TURBO-MACHINES

[75] Inventors: Pierre M. Raffy, Saint-Germain Laxis; Pierre A. André, Paris; Jean-Pierre Y. B. Girault, Dammarie les Lys; Gerhard Richter, Boissise le Roi; Jean-Claude P. H. P. Thévenin, Saint-Maur-des-Fosses, all of France

[73] Assignee: Societe Nationale d'Etude et de Construction de Moteurs d'Aviation, Paris, France

[21] Appl. No.: 849,407

[22] Filed: Nov. 7, 1977

[30] Foreign Application Priority Data

Nov. 5, 1976 [FR] France ................. 76 34066

[51] Int. Cl.² ............................................. F04D 29/66
[52] U.S. Cl. ............................... 415/115; 60/226 R; 181/206; 415/119
[58] Field of Search ............ 60/226 R, 226 A, 226 B, 60/269, 264; 415/115, 119, DIG. 1; 181/206, 220; 137/15.1, 15.2

[56] References Cited

U.S. PATENT DOCUMENTS

| 3,508,838 | 4/1970 | Martenson | 137/15.1 |
| 3,572,960 | 3/1971 | McBride | 415/119 |
| 3,693,749 | 9/1972 | Motsinger et al. | 415/119 |
| 3,936,215 | 2/1976 | Hoff | 415/115 |
| 3,951,566 | 4/1976 | Mattei et al. | 415/119 |
| 4,044,203 | 8/1977 | Swinbanks | 181/206 |

FOREIGN PATENT DOCUMENTS 2161696  6/1973  Fed. Rep. of Germany ........... 181/206

*Primary Examiner*—Douglas Hart
*Attorney, Agent, or Firm*—Watson, Cole, Grindle & Watson

[57] ABSTRACT

A device for reducing the noise generated by the blades of at least one ring of rotor blades in a turbo-machine by the production of a counter-noise of opposed phase. This is achieved by injection of jets of fluid under pressure through orifices borne by the rotor located near to the periphery of the blades, and the flow of the fluid is modulated at a frequency which is a whole number multiple of the rotational frequency of the rotor shaft. Regulation of phase of the modulated injected fluid is carried out in such a manner that the acoustic waves generated by the injected fluid are substantially in opposition, with respect to phase, to those of the noise to be reduced.

10 Claims, 7 Drawing Figures

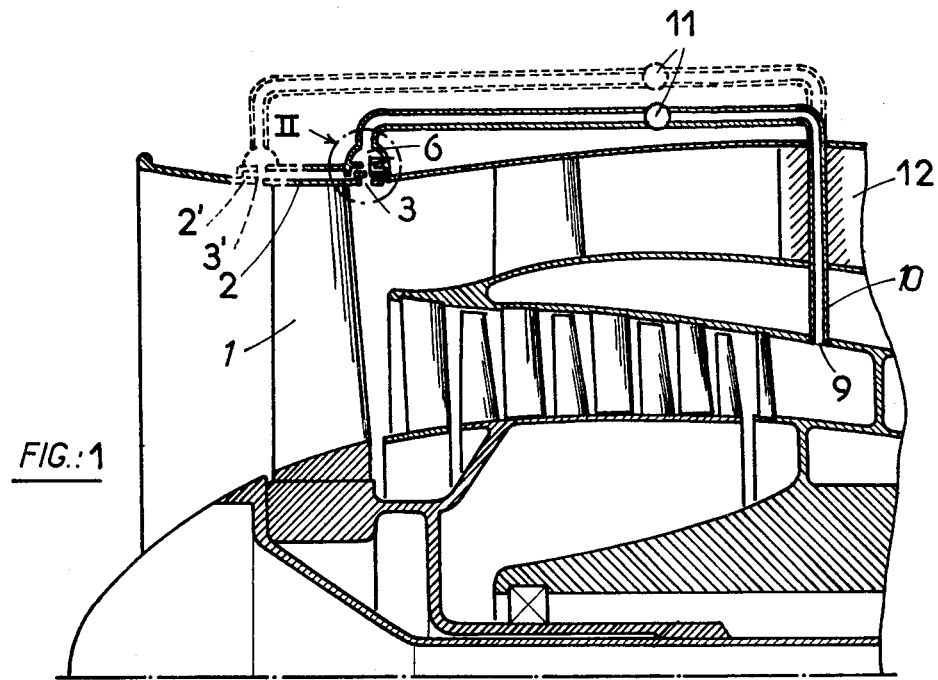
FIG.:1
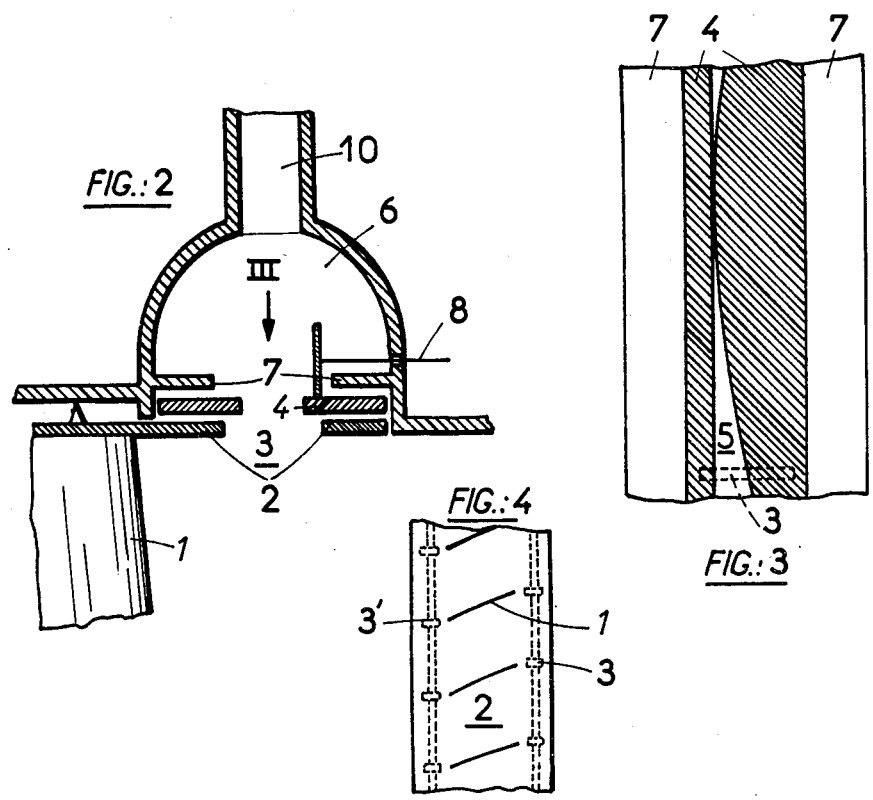
FIG.:2
FIG.:3
FIG.:4

METHOD AND DEVICE FOR REDUCING THE NOISE OF TURBO-MACHINES

BACKGROUND OF THE INVENTION

This invention relates generally to the reduction of noise produced in a turbo-machine by the blades of a rotary ring of blades, either acting alone or in cooperation with the blades of a ring of stator vanes, and which blades generate a noise at their frequency of passage or, possibly, at a multiple of this frequency.

To reduce this noise, it has already been suggested to generate a kind of "counter-noise" at the same frequency as that to be reduced, but substantially opposed in phase to this latter.

One of the suggested solutions consisted in employing a secondary source of noise placed immediately adjacent the principal noise generator. By emitting a noise with an adequate frequency make-up and carefully selecting the amplitude and phase conditions, in certain sectors a reduction and even an obliteration of the noise could be obtained by interference.

It has also been suggested to reproduce the noise of the rotor by injecting jets of pressurised fluid into the flow passage of the engine through orifices in one or a multiplicity of adjustable rings rotating with the rotor. The feeding of fluid should be done by way of the fan shaft.

None of these solutions has, however, provided a satisfactory result, either because their implementation proved to be too complicated to be used in practice, or because the results obtained were too limited to compensate for the disadvantages arising from the installation of such a system.

Thus, the object of the invention is to obtain a better result together with a simplification of the method whereby the construction costs are more reasonable.

SUMMARY OF THE INVENTION

In the method according to the invention for the reduction of the noise produced in a turbo-machine by the blades of a rotor ring, a counter-noise of opposed phase is generated by means of the injection, through orifices carried by the rotor, of fluid, the flow of which is modulated to at least a frequency which corresponds, with respect to a movable datum point, to at least a multiple of the rotation frequency of the machine shaft, the regulating of the phase of the modulated injected fluid being effected in such a manner that the acoustic waves generated by the injected fluid are substantially opposed to the phase of those of the noise to be reduced.

As it is a matter of reducing the sounds of the rotor when they are considered from the viewpoint of their relation to the fluctuation of observable pressure on the rotor blades, and as the frequency of the fluctuations differs, because of the change of datum point, from that observable in constant space; the significance of q (q=1,2,3,--) with respect to the multiples to be selected of the rotation frequency of the rotor shaft is determined by tests, or better by preliminary measurements by means of sensors implanted in the moving blades. For reasons of convenience, it will frequently be endeavoured to restrict the rotation frequency to a sole multiple q. The flows injected near to two consecutive moving blades should be dephased by $2\pi q/Z_R$, $Z_R$ being the number of rotor blades.

The invention also relates to a device for carrying out this method in a turbo-machine.

In this device, the orifices borne by the rotor of the turbo-machine and through which the fluid injection is accomplished, are located near the tips of the rotor blades.

According to another characteristic of the device according to the invention, the supply of fluid to be injected, the conveyance of the fluid to the immediate vicinity of the tips of the rotor blades, and the modulation of its flow, are all carried out by means of pipes and structures embedded in stationary parts of the turbo-machine.

According to another characteristic of the device according to the invention, the injection of fluid takes place from an annular manifold fixed coaxilly respect to the turbo-machine shaft and through holes formed as uniformly spaced apart perforations in the periphery of a cylindrical screen which is integral with the tips of the rotor blades and oriented to be coaxial with the engine shaft. The modulation of the fluid flow takes place by means of a coaxial ring placed between the cylindrical screen, which it surrounds in slidable fitting engagement, and the annular manifold to which it is connected, the ring being formed so as to include a peripheral slot of cyclically varying width which is formed through the entire thickness of the ring, the number of cycles of width variation being equal to the selected multiple of the rotational frequency of the rotor shaft one face of the slot is in direct communication with the manifold, whereas the second face is in communication with the rotating circular screen, and the fluid flows injected from the manifold, through the slot, and through the perforations in the cylindrical screen are modulated due to the passage of these perforations past the second face of the slot as the cylindrical screen rotates, and the regulation of phase of the injected flow is achieved by varying the angular position of the ring round the machine shaft.

The fluid used for the injection can be a gas, for example air, obtained from a part of the machine where the gas has a sufficient pressure.

The invention will be described in a non-limiting manner and better understood by discussion of some embodiments relating to a bypass gas turbine aero engine, illustrated in the accompanying drawings.

DESCRIPTION OF THE DRAWINGS

In the drawings,

FIG. 1 shows schematically a half-axial section of an engine according to the invention;

FIG. 2 shows the detail II of FIG. 1 on a larger scale;

FIG. 3 is a view in the direction of the arrow III of FIG. 2;

FIG. 4 shows a development of the cylindrical screen used in this example.

DETAILED DISCUSSION OF THE PREFERRED EMBODIMENTS

Figure 5:
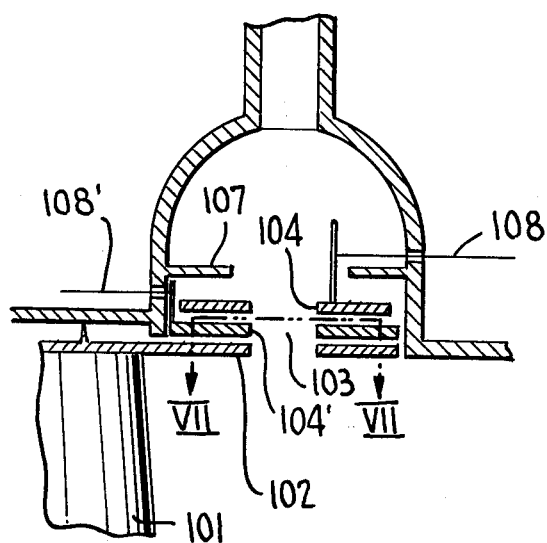
FIGS. 5 and 6 are views similar to FIGS. 2 and 3, respectively, showing another embodiment.

In FIG. 1, which represents a schematic section of a double-flow or bypass gas turbine featuring a single stage fan, an inventive device is shown for cancelling the fan rotor noise.

Since it is generally in the vicinity of the tips of the moving blades that the aerodynamic actions giving rise to acoustic waves are the largest, according to the present invention fluid injection is accomplished near to the tip of each moving fan blade 1 through one or a multiplicity of holes 3 fixed positioned with respect to the fan blade. Taking into account the results collected from previous tests or measurements, fluid injection takes place either through holes 3 located next to the trailing edge (as shown in solid lines in FIG. 1) or through holes 3' located near to the leading edge (as shown in dotted lines); however, it is also possible to inject fluid simultaneously near to the trailing edge and near to the leading edge.

The fluid injection holes 3 (or 3'), as can be seen in FIGS. 1 and 2, are formed as perforations in a cylindrical screen 2 which is integral with the free tips of the rotor blades 1 and which rotates with the rotor. This screen, a developed view of which is shown in FIG. 4, extends past the tips of the blades 1, either in a downstream direction (in solid lines) to allow for the provision of holes 3 in the vicinity of the trailing edges of the blades 1, or in an upstream direction (in dotted lines) to allow for the provision of holes 3' near to the leading edges of the blades 1. The extending part of the cylindrical screen 2 fixed to the rotor blades is surrounded by a second ring 4 which can be considered as fixed, a description applied because of the degree of freedom being so slight, as explained in the following. This ring 4 features a slot 5 of cyclically varying width (see FIG. 3) and has its first or outer face in direct communication with a toroidal manifold 6 which surrounds it.

During the passage of the perforations 3 in the screen 2 past the length of the slot 5 in the ring 4 due to the rotation of the screen, the total fluid flow through the toroidal manifold 6 is transformed into $Z_R$ modulated partial flows escaping through the injection perforations 3. A mechanical flow regulator is thus formed. The injection perforations 3 are, in effect, windows with edges parallel to the fan axis, the axial extent of the windows being larger at the largest width of the slot 5 in the ring 4. The sections of the slot 5 opposite the perforations 3 are practically at the pressure which is produced near to the tips of the blades 1 and the flow varies practically linearly with the width of the slot 5. A good sinusoidal modulation of the flow should be able to be obtained by making a practically sinusoidal variation in the width of the slot 5. This cycle of variation should be repeated q times around the periphery of the slot 5, q being small and less than $Z_R$.

In order to be able to regulate the modulation phase, it is possible to adjust the angular position of the practically fixed ring 4 in which the slot 5 is formed, around the fan axis. Support of the ring 4 is effected by two collars 7 which are securely fixed and fitted to the inside wall of the toroidal manifold 6 which encompasses the edges of the ring 4. The variation of position which must be available to 1/Q of a turn (q=1,2,3,--). The rotation of the ring 4 giving the variation in position may be obtained by means of a system 8 consisting, for example, of a ram or small electric motor.

Figure 6:
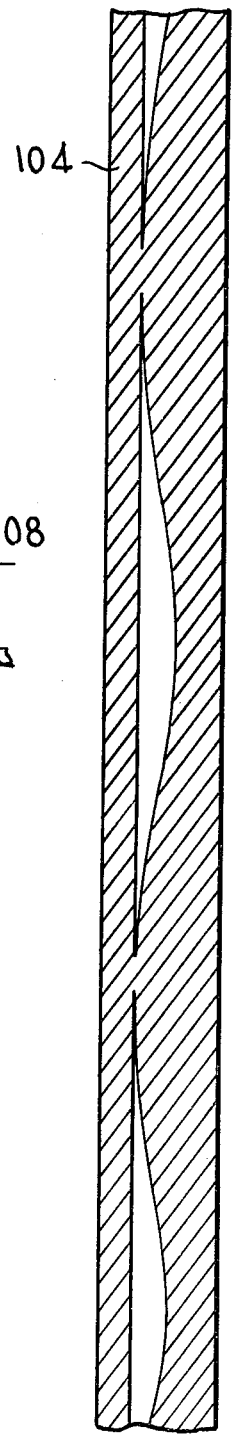
Figure 7:
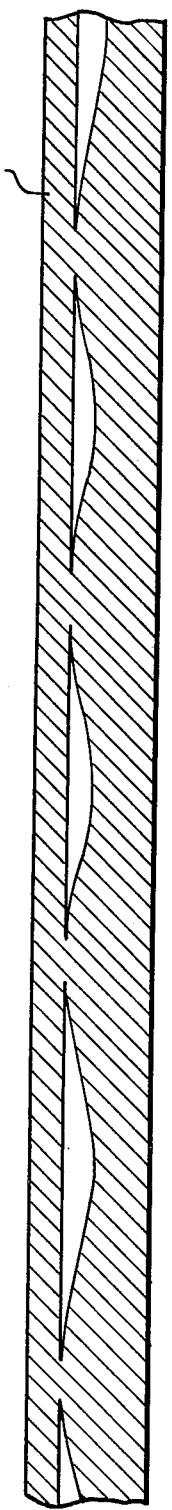
FIG. 7 is a view along line VII—VII of FIG. 5.

FIGS. 5, 6 and 7 show an embodiment wherein the modulation is effected simultaneously at several frequencies which are multiples, different values of q, of the rotational frequency of the fan shaft.

FIGS. 5-7 show means for regulating separately the phase relating to each of the frequencies, comprising several modulators, i.e. several rings 104, 104' of the same diameter, arranged one behind the other and in the interior of which the projecting part of the cylindrical screen 102 rotates. The projecting part is then larger than in the case where a single modulator is employed and it is perforated with injection holes 103 the axial extent of which is also larger, so that these holes come simultaneously into communication with the slots 105 of all the rings 104, 104'.

The toroidal manifold should be fed by air taken from a zone of the engine where the pressure is sufficient and distinctly greater than that which the air will encounter at output in the vicinity of the rotor blades. Since the pressure should be uniform over the entire periphery of the manifold, this should receive air at a multiplicity of points spaced at equal distances around its periphery.

In the embodiment shown in FIG. 1, the toroidal manifold 6 is fed by taking air from the primary duct of the engine through intakes 9 from where this air is led to the manifold by pipes 10 in which are inserted flow regulation shutters 11. At any one moment, the position of all these shutters should be the same. The toroidal manifold and the largest part of the proposed device being located on the outside of the engine, the pipes 10 have to cross the secondary duct. In a preferred solution they pass by way of a support strut 12.

The adaptation of the device to different operating conditions of the engine is done by actuating the shutters 11 controlling the amount of flow and the phase variation control 8. It can be controlled by a microphone embedded flush in the wall, either in the downstream duct or in the duct upstream of the fan, according to whether the reduction of noise is sought downstream or upstream. It is again possible to omit the injector from one of the blades and to fit this blade with a sensor which collects the required information in the rotational space of the rotor.

This modification increases the efficiency of the adaptation, but that of the injection is slightly diminished.

The above method for the reduction of noise produced in a turbo-machine by the blades of a rotor ring is, of course, applicable to any stage of a turbo-machine.

Notably, the method forming the object of the invention can be applied to the reduction of noise emitted by the rotor blades of a turbine. In this case, if the rotor blades of the turbine are provided inside with air conduits so as to ensure their cooling, a part of these conduits could sometimes be employed in carrying out the method.

We claim:
1. A turbo-machine which comprises:
   at least one ring of circumferentially spaced, radially oriented rotor blades, the inner edges of which are attached to a rotor shaft;
   a rotatable cylindrical screen positioned around said rotor blades and integrally connected to their outer edges; and
   means for reducing the noise produced by the rotor blades during rotation with said cylindrical screen, said means comprising
      means forming a plurality of perforations in said cylindrical screen near the peripheral edges of said rotor blades,
      means for injecting pressurized fluid in the form of a jet through each of said perforations in said cylindrical screen,
      means capable of modulating the flow of said fluid jets at a frequency which is a whole number multiple of the rotational frequency of said rotor shaft, means for regulating the phase of said modulated injected fluid such that the acoustic waves generated by said fluid flows are substantially in opposition with respect to phase to those of the noise created by said rotating blades, said means capable of modulating the flow of said fluid jets comprising a stationary pierced ring which is configured to be coaxial with said cylindrical screen and positioned in slidable engagement with the outer periphery thereof, said ring being located between said means forming perforations in said cylindrical screen and said means for injecting pressurized fluid through each perforation such that said fluid must pass therethrough.

2. A turbo-machine according to claim 1 wherein said means for regulating the phase of said modulated injected fluid comprises means connected to said stationary pierced ring to adjust its angular position.

3. A turbo-machine according to claim 1 wherein said stationary pierced ring includes a slot therethrough of a cyclically varying width with respect to the fluid flow passing from said means for injecting pressurized fluid through each perforation to each perforation, such that a sinusoidal modulation of fluid flow through said perforations is obtained.

4. A turbo-machine according to claim 3 wherein said stationary pierced ring surrounds said cylindrical screen in annular fashion and wherein said slot of cyclically varying width is repeated in said ring a number of times equal to the proportion coefficient between the frequency of modulation and the rotational frequency of said rotor shaft, each repetition being separated by a portion of said ring which includes no opening therethrough.

5. A turbo machine according to claim 1 wherein said perforations in said cylindrical screen comprise equally spaced apart holes of similar configuration, wherein there are an equal number of holes as there are rotor blades, and wherein the dimensions of said holes, taken parallel to said rotor axis, is at least equal to the maximum width of the slots in said stationary pierced ring.

6. A turbo-machine according to claim 1 wherein a plurality of stationary pierced rings which are configured to be coaxial with said cylindrical screen are positioned between said means forming perforations in said cylindrical screen and said means for injecting pressurized fluid through each perforation, said rings having slots therethrough of different cyclically varying widths with respect to the fluid flow passing from said means for injecting pressurized fluid through each perforation to each perforation, such that the fluid flows are modulated to the different frequencies of the rotational frequency of the fan shaft.

7. A turbo-machine according to claim 6 wherein said means for regulating the phase of said modulated injected fluid comprises means connected to each of said stationary pierced rings to adjust their angular positions.

8. A turbo-machine according to claim 1 wherein each of said rotor blades has a leading edge and trailing edge, and wherein a perforation is located next to each trailing edge.

9. A turbo-machine according to claim 1 wherein each of said rotor blades has a leading edge and a trailing edge, and wherein a perforation is located next to each leading edge.

10. A turbo-machine according to claim 1 wherein each of said rotor blades has a leading edge and a trailing edge, and wherein a perforation is located next to each trailing edge and leading edge.

* * * * *